United States Patent [19]

Inada et al.

[11] Patent Number: 5,114,765
[45] Date of Patent: May 19, 1992

[54] LARGE-SIZED CONTAINER

[75] Inventors: Jun Inada; Shinichi Sato; Ryoichi Shimizu, all of Yokkaichi; Akinobu Kitani; Kunio Nakano, both of Ube, all of Japan

[73] Assignees: Tosoh Corporation; Ube Industries, Ltd., both of Yamaguchi; Sumitomo Corporation, Osaka, all of Japan

[21] Appl. No.: 584,218

[22] Filed: Sep. 18, 1990

[30] Foreign Application Priority Data

Sep. 22, 1989 [JP] Japan .................................. 1-246871

[51] Int. Cl.$^5$ ...................... B29D 22/00; B32B 27/08
[52] U.S. Cl. .................................. 428/35.7; 428/36.6; 428/475.8; 428/476.1; 526/66
[58] Field of Search ................ 428/35.7, 475.8, 476.1, 428/36.6; 526/66; 264/515

[56] References Cited

U.S. PATENT DOCUMENTS

| | | | |
|---|---|---|---|
| 3,373,223 | 3/1968 | Armstrong | 525/179 |
| 3,373,224 | 3/1968 | Mesrobian et al. | 525/179 |
| 4,410,482 | 10/1983 | Subramanian | 428/35.7 |
| 4,416,942 | 11/1983 | Diluccio | 428/332 |

FOREIGN PATENT DOCUMENTS 50-75256 6/1975 Japan .
58-209563 12/1983 Japan .

*Primary Examiner*—James J. Seidleck
*Assistant Examiner*—Charles R. Nold
*Attorney, Agent, or Firm*—Armstrong, Nikaido, Marmelstein, Kubovcik & Murray

[57] ABSTRACT

A large size container made of laminate including a layer (A) of modified polyolefin modified with 0.005 to 1.0 wt. % unsaturated carboxylic acid and a layer (B) of a mixture of (i) 50 to 95 wt. % polyamide and (ii) 5 to 50 wt. % polyolefin modified with 0.01 to 1.0 wt. % unsaturated carboxylic acid.

13 Claims, No Drawings

LARGE-SIZED CONTAINER

BACKGROUND OF THE INVENTION

The present invention relates to a large-sized container excellent in the impact resistance, solvent permeation resistance and moldability.

For containers used for solvents and the like, metal- or glass-made containers have been commonly used so far, but, recently, plastic-made containers have come into use. The plastic containers have various merits of light weight, excellent impact resistance, unnecessity of treatments such as rust-proofing etc., high freedom in design, and the like. As a plastic satisfying these features, polyolefins are suitable from their excellent processibility and is utilized in different fields such as containers for various industrial chemicals, kerosene cans, drum cans, gasoline tanks, and the like.

However, as a drawback of polyolefin containers, poor solvent permeation resistance can be mentioned. In order to improve this drawback, there is a multilayer container of laminated polyolefin with a barrier resin such as polyamide or the like. But, from the fact that polyamide has no affinity to polyolefin, an adhesive layer must be interposed between both layers at the time of lamination.

For this reason, there have been in dangers that, in the case of a large-sized container, peeling-off occurs between layers caused by a large impact upon dropping because of the large inner volume thereof and the wall thickness becomes nonuniform by the draw-down of parison on blow molding thereby increasing the impact resistance. Moreover, the adhesion strength sometimes decreases at those portions of thin wall thickness originating from the nonuniformity of wall thickness. Hence, higher adhesion strength is required in the case of a large-sized container over the case of a small-sized container.

On the other hand, in the case of containers for solvents such as alcohol etc., polyamide tends to swell with alcohol etc. Hence, the case that the polyamide layer cannot be used for the inner layer of container has often been experienced. Moreover, it could not be used for the outer layer due to the problem of impact resistance. Thus, polyamide is positioned as the intermediate layer, but, in this case, the construction of the container cannot help becoming a complicated construction comprising three kinds of materials and five layers of polyolefin/adhesive/polyamide/adhesive/polyolefin. According to the method of making the construction with three kinds and five layers, a complicated structure of dies is required as well as the necessity of at least three extruders resulting in very complicated installation and production.

The objective of the invention is to provide a large-sized container wherein, different from the case of such conventional method, the adhesion is good without the interposition of an adhesive layer and yet the processibility and the impact resistance are good.

As a result of diligent investigations in view of the situation aforementioned, the inventors have found a large-sized container of two kinds of materials and three layers not requiring the adhesive layer, leading to the completion of the invention.

SUMMARY OF THE INVENTION

The invention relates to a large-sized container made of a laminate comprising:

(A) a modified polyolefin modified with unsaturated carboxylic acid, the content thereof being 0.005 to 1.0 wt. %, having a melt flow rate determined under a load of 2.16 kg of 0.01 to 10 g/10 min and a melt flow rate determined under a load of 21.6 kg of 0.5 to 50 g/10 min and being $Mw/Mn \geq 17$ and $Mz/Mw \geq 7$, and (B) a modified polyamide comprising (a) 50 to 95 wt. % polyamide and (b) 5 to 50% polyolefin modified with unsaturated carboxylic acid, the content thereof being 0.01 to 1.0 wt. %, having a melt flow rate determined under a load of 2.16 kg of 0.01 to 10 g/10 min, the mixture of these (a) and (b) having a melt flow rate determined at a temperature of 235° C. under a load of 2.16 kg of 0.01 to 7.0 g/10 min.

DETAILED DESCRIPTION OF THE INVENTION

In following, the invention will be illustrated in detail.

The polyolefin before modification to be used in the containers of the invention includes at least one of high-density polyethylene, low-density polyethylene, linear low-density polyethylene, ethylene-vinyl acetate copolymer, polypropylene, etc. Among these polyolefins, high-density polyethylene (hereinafter abbreviated as HDPE) is preferable from the considerations of moldability, strength and impact resistance.

The modified polyolefin to be used in the invention includes a polyolefin grafted with unsaturated carboxylic acid onto said polyolefin.

The concrete examples of unsaturated carboxylic acid include acrylic acid, methacrylic acid, maleic acid, fumaric acid, itaconic acid, citraconic acid, etc. and their derivatives. Concrete derivatives are acid anhydrides, esters, amides, imides, metal salts, etc. and, for example, maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monoethyl itaconate, diethyl itaconate, acrylamide, methacrylamide, maleic monoamide, maleic diamide, maleic N-monoethylamide, maleic N,N-diethylamide, maleic N-monobutylamide, maleic N,N-dibutylamide, fumaric amide, fumaric diamide, fumaric N-monoethylamide, fumaric N,N-diethylamide, fumaric N-monobutylamide, fumaric N,N-dibutylamide, maleimide, N-butylmaleimide, N-phenylmaleimide, sodium acrylate, sodium methacrylate, potassium acrylate, potassium methacrylate, etc. can be mentioned. One or not less than two kinds of these compounds may be used, but maleic anhydride is most preferable.

As methods for grafting these monomers onto polyolefin, a method wherein polyolefin, monomer and radical generator such as peroxide are mixed and grafting is performed by a melt extrusion method, a method wherein monomer and radical initiator are added to polyolefin suspended or dissolved into suitable solvent and grafting is performed by heating, and the like can be mentioned.

The content of unsaturated carboxylic acid in the modified polyolefin (A) to be used in the invention lies within a range of 0.005 to 1.0 wt. %, preferably 0.01 to 0.1 wt. %. If under 0.005 wt. %, the adhesion is insufficient and, if over 1.0 wt. %, the cost becomes high, which is not preferred.

Moreover, the content of the unsaturated carboxylic acid for modified polyolefin (B-b) to be used for intermediate layer lies within a range of 0.01 to 1.0 wt. %, preferably 0.05 to 0.5 wt. %. If under 0.01 wt. %, the compatibility with polyamide is insufficient and, if over 1.0 wt. %, the cost becomes high, which is not preferred, though the compatibility with polyamide is sufficient.

The melt flow rate (determined at a temperature of 190° C. under a load of 2.16 kg according to JIS K 7210, hereinafter abbreviated as MFR) of modified polyolefin (A) to be used in the invention is 0.01 to 10.0 g/10 min, preferably 0.02 to 3.0 g/10 min. If under 0.01 g/10 min, the fluidity on melting sometimes becomes poor and, if over 10.0 g/10 min, the draw-down property sometimes becomes high, resulting in difficult molding. Further, the melt flow rate under a load of 21.6 kg (hereinafter abbreviated as HLMFR) lies within a range of 0.5 to 50 g/10 min and yet Mw/Mn and Mz/Mw are Mw/Mn≧17 and Mz/Mw≧7. Mn, Mw and Mz as used herein are Mn: number average molecular weight, Mw: weight average molecular weight and Mz: Z-average molecular weight, respectively. They were determined by calculation on the basis of molecular weight distribution measured by the light scattering method using a GPC on-line viscometer system combined gel permeation chromatography (GPC) with viscometer. When Mw/Mn<17 and Mz/Mw<7, die swelling and melt tension decrease thereby not providing the molded products with uniform wall thickness. On the contrary, the modified polyolefin (B-b) to be mixed with polyamide is preferably 0.01 to 10.0 g/10 min and more preferably 0.02 to 5.0 g/10 min. If under 0.01 g/10 min, the fluidity on melting sometimes becomes poor and, if over 10.0 g/10 min, the elongation of the modified polyamide after melting and mixing with polyamide sometimes decreases, which is not preferred. Moreover, n-heptane solubles content is preferably not more than 3.0 wt. %. If over 3.0 wt. %, carbon and sludge tend to accumulate in the engine, which is not preferred.

The polyamide (B-a) to be used in the invention is a linear high molecule having the acid amide linkage —CONH—. It may be nylon-6, nylon-6,6, nylon-6,10, nylon-11, nylon-12 or a blend or copolymer of these. Among these nylons, nylon-6 is preferable from the considerations of moldability and strenght. Moreover, in the case of container such as a gasoline tank, for which particularly high adhesion strenght is required, a polyamide that has a high proportion of amino groups at its ends, is preferable, the concentration ratio of end amino groups to end carboxyl groups being not less than 1.5, particularly preferably not less than 2.0. The concentration ratio of end amino groups to end carboxyl groups means a ratio of concentration of end amino groups to that of end carboxyl groups, when expressing the concentrations of the former and the latter by g. equivalent/g, respectively. Moreover, the upper limit of the concentration ratio of end groups of polyamide has no particular restriction and a polyamide having amino groups at all ends can also be used. There is also no particular restriction about the molecular weight of the polyamide with high end amino group concentration to be used in the invention, but, usually, a polyamide that has a relative viscosity measured according to JIS K 6810 of 3.0 to 4.8 is preferably used.

Moreover, the polyamide with high end amino grooup concentration may be any one produced by well-known method of persons in the very trade, and it is only necessary to be one polymerized using chain transfer agents, for example, m-xylylenediamine, p-xylylenediamine, hexamethylenediamine, dodecamethylenediamine, etc. at the time of polymerization.

The modified polyamide (B) in the invention indicates a mixture of the foregoing polyamide with modified polyolefin. The mixing proportion of polyamide with modified polyolefin lies within a range of 50 to 95 wt. % polyamide (B-a) and 5 to 50 wt. % modified polyolefin (B-b). If the proportion of modified polyolefin is under 5 wt. %, the adhesion between layers decreases, though the elongation of the modified polyamide is sufficient. Moreover, if over 50 wt. %, the solvent permeation resistance and elongation of the modified polyamide decrease, which is not preferred, though the adhesion is sufficient.

MFR (determined at a temperature of 235° C. under a load of 2.16 kg according to JIS K 7210, hereinafter abbreviated as 235° C. MFR) of modified polyamide (B) thus obtained is 0.01 to 7.0 g/10 min. If under 0.01 g/10 min, the fluidity on melting sometimes becomes poor and, if over 7.0 g/10 min, the processibility sometimes becomes poor in ways that the wall thickness of the modified polyamide layer is not become uniform, and the like.

As to the methods for mixing polyamide with modified polyolefin, dry blending using conical blender or V-blender and melt blending using extruder, kneader, banbury or the like can be mentioned. Melt blending is preferable from the point of uniformity.

As to the molding methods for a multilayer container using these resins, any molding method may be used, but coextrusion blow molding is preferable. As processes therefor, extrusion system and accumulator system can be mentioned, but the accumulator system is suitable particularly for a large-sized container. As to the molding conditions, such temperature establishments that the resin temperature of modified polyolefins to be used for the outer layer and the inner layer is 220° to 230° C. and the resin temperature of modified polyamide to be used for the intermediate layer is 230° to 250° C. are preferable.

The large-sized container as mentioned here has usually no distinct definition, but generally is one with a capacity of about 20 liters or more. Moreover, as the composition of the layers thereof, (A)/(B), (B)/(A) and (A)/(B)/(A) are conceivable depending on the content and use. Among them, the composition of (A)/(B)/(A) is preferable from the considerations of impact resistance, regardlessness of content, etc. Further, in special uses, various thermoplastic resins may be laminated further onto these construction.

In this manner, a large-sized container having a multilayer structure and exhibiting good impact resistance, solvent permeation resistance and interlayer adhesion can be obtained.

Further, it is also possible to formulate with fillers such as at least one antioxidant, ultraviolet absorber, photo-protector, phosphite stabilizer, peroxide decomposer, nucleating agent, plasticizer, lubricant, antistatic agent, flame retardant, pigment, dye, carbon black, asbestos, glass fibers, kaolin, talc, silica, silica alumina, etc., if need be.

In following, examples of the invention and comparative examples corresponding thereto will be illustrated, but the invention is not confined to these.

EXAMPLE 1

The molding was performed using accumulator type below molding machine (90 mm$\phi$, 30 mm$\phi$).

A resin grafted with 0.04 wt. % maleic anhydride onto HDPE (Nipolon Hard 8600A, made by Tosoh Corporation), having MFR of 0.02 g/10 min, HLMFR of 6.0 g/10 min, Mw/Mn of 18.2 and Mz/Mw of 7.2 was fed from an extruder (90 mm$\phi$) for the inner layer and the outer layer to die for multilayer. On the other hand, with respect to modified polyamide to be used for the intermediate layer, nylon-6 (1030B, made by Ube Industries, LTD.) and a resin grafted with 0.2 wt. % maleic anhydride onto HDPE (Nipolon Hard 8300A, made by Tosoh Corporation), having MFR of 0.35 g/10 min were melted and mixed at a proportion of 6:4 with 65 mm$\phi$ extruder. The modified polyamide thus obtained having 235° C. MFR of 0.35 g/10 min was fed from an extruder (30 mm$\phi$) for the intermediate layer to die for multilayer. The molding temperature was so established that the resin temperature of the modified polyolefins for the inner layer and the outer layer is 230° C. and that of the polyamide for the intermediate layer is 240° C. so as to perform the multilayer blow molding. The multilayer container was made as a 40-liter cylindrical plastic drum. In the plastic drum so obtained, interlayer adhesion strength, low-temperature drop strength, solvent permeation and thickness were measured, the results of which are shown in Table 1. Here, the interlayer adhesion strength (unit: kg/10 mm) was determined by T peeling-off of a specimen with a width of 10 mm and a length of 120 mm at a peeling rate of 200 mm/min. The low-temperature drop strength (unit: number of unbroken samples (drums)/number of samples (drums)) was shown by a ratio of number of unbroken samples to number of samples when the drums wholly filled with a 50% aqueous solution of ethylene glycol were dropped from a height of 10 m after allowed to stand for 24 hours in a cryogenic chamber of −40° C. The solvent permeation (unit: g/day) was determined after aging the plastic drums filled by 50% with toluene, hexane and octane, respectively, for 30 days at 40° C. Moreover, with respect to the evaluation of the thickness, the overall thickness and the thickness of the intermediate layer were measured at ten spots at each of the top, middle and bottom portions in the direction of circumference, that is, at 30 spots in total, and average, maximum and minimum values are shown.

EXAMPLE 2

The multilayer blow molding was performed by the quite same procedure as in Example 1, except that nylon-6 (1030B, made by Ube Industries, LTD.) and a resin grafted with 0.2 wt. % maleic anhydride onto HDPE (Nipolon Hard 8300A, made by Tosoh Corporation), having MFR of 0.35 g/10 min were melted and mixed at a proportion of 7:3 with 65 mm$\phi$ extruder and the modified polyamide having 235° C. MFR of 0.40 g/10 min was used as the intermediate layer.

EXAMPLE 3

The multilayer blow molding was performed by the quite same procedure as in Example 1, except that nylon-6 (1030B, made by Ube Industries, LTD.) and a resin grafted with 0.2 wt. % maleic anhydride onto HDPE (Nipolon Hard 8300A, made by Tosoh Corporation), having MFR of 0.35 g/10 min were melted and mixed at a proportion of 8:2 with 65 mm$\phi$ extruder and the modified polyamide having 235° C. MFR of 0.45 g/10 min was used as the intermediate layer.

EXAMPLE 4

The multilayer blow molding was performed by the quite same procedure as in Example 1, except that a modified polyolefin grafted with 0.08 wt. % maleic anhydride onto HDPE (Nipolon Hard 8600A, made by Tosoh Corporation), having MFR of 0.02 g/10 min, HLMFR of 6.2 g/10 min, Mw/Mn of 18.1 and Mz/Mw of 7.1 was used.

EXAMPLE 5

The multilayer blow molding was performed by the quite same procedure as in Example 1, except that nylon-6 (made by Ube Industries, LTD.) having a relative viscosity of 4.2 and a concentration ratio of end amino groups to end carboxyl groups of 2.1 and a modified HDPE (made by Tosoh Corporation) modified with 0.2 wt. % of maleic anhydride, having MFR of 0.35 g/10 min were melted and mixed at a proportion of 7:3 with 65 mm$\phi$ extruder and the modified polyamide having 235° C. MFR of 0.40 g/10 min was used as the intermediate layer.

EXAMPLE 6

The multilayer blow molding was performed by the quite same procedure, except that nylon-6 (1022B, made by Ube Industries, LTD.) and a modified polyolefin grafted with 0.2 wt. % maleic anhydride onto HDPE (Nipolon Hard 2000, made by Tosoh Corporation), having MFR of 15 g/10 min were melted and mixed at a proportion of 8:2 with 65 mm$\phi$ extruder and the modified polyamide having 235° C. MFR of 6.0 g/10 min was used as the intermediate layer in Example 1.

COMPARATIVE EXAMPLE 1

The multilayer blow molding was performed by the quite same procedure, except that HDPE (Nipolon Hard 8600A, made by Tosoh Corporation) having MFR of 0.03 g/10 min was used in place of modified polyolefin to be used for outer layer and inner layer in Example 1.

COMPARATIVE EXAMPLE 2

The multilayer blow molding was performed by the quite same procedure, except that unmodified nylon-6 (1030B, made by Ube Industries, LTD.) was used in place of modified polyamide to be used as the intermediate layer in Example 1.

COMPARATIVE EXAMPLE 3

The multilayer blow molding was performed by the quite same procedure, except that nylon-6 (1030B, made by Ube Industries, LTD.) and a modified polyolefin grafted with 0.2 wt. % maleic anhydride onto HDPE (Nipolon Hard 8300A, made by Tosoh Corporation), having MFR of 0.35 g/10 min were melted and mixed at a proportion of 4:6 with 65 mm$\phi$ extruder and the modified polyamide having 235° C. MFR of 0.25 g/10 min was used as the intermediate layer in Example 1.

COMPARATIVE EXAMPLE 4

The multilayer blow molding was performed by the quite same procedure, except that a modified HDPE grafted with 0.08 wt. % maleic anhydride, having MFR of 0.02 g/10 min, HLMFR of 5.8 g/10 min, Mw/Mn of 16 and Mz/Mw of 5.5 was used for inner and outer layers in Example 1.

COMPARATIVE EXAMPLE 5

The multilayer blow molding was performed by the quite same procedure, except that a modified HDPE grafted with 0.08 wt. % maleic anhydride, having MFR of 0.02 g/10 min, HLMFR of 5.7 g/10 min, Mw/Mn of 17.2 and Mz/Mw of 6.5 was used for inner and outer layers in Example 1.

COMPARATIVE EXAMPLE 6

The multilayer blow molding was performed by the quite same procedure, except that a modified HDPE grafted with maleic anhydride and unmodified HDPE were melt and mixed at a proportion of 25:75 and HDPE mixture having MFR of 0.02 g/10 min, HLMFR of 6.0 g/10 min, Mw/Mn of 17.5 and Mz/Mw of 7.1 was used for inner and outer layers in Example 1.

TABLE 1

|  |  | Example 1 | Example 2 | Example 3 | Example 4 | Example 5 | Example 6 |
|---|---|---|---|---|---|---|---|
| Overall Wall thickness (mm) | Min. | 3.2 | 3.3 | 3.2 | 3.3 | 3.3 | 3.3 |
|  | Ave. | 4.2 | 4.3 | 4.1 | 4.0 | 4.2 | 4.1 |
|  | Max. | 6.2 | 6.8 | 6.5 | 6.2 | 6.3 | 6.4 |
| Wall thickness of intermediate layer (mm) | Min. | 0.06 | 0.06 | 0.07 | 0.07 | 0.06 | 0.03 |
|  | Ave. | 0.11 | 0.10 | 0.11 | 0.10 | 0.10 | 0.10 |
|  | Max. | 0.13 | 0.12 | 0.13 | 0.12 | 0.12 | 0.24 |
| Adhesion strength (kg/10 mm) |  | 8.3 | 7.2 | 6.8 | 10.9 | 10.5 | 8.6 |
| Low-temperature drop strength (drums/drums) |  | 10/10 | 10/10 | 10/10 | 10/10 | 10/10 | 10/10 |
| Solvent permeation (g/day) | Toluene | 0.2 | 0.2 | 0.2 | 0.2 | 0.2 | 0.2 |
|  | Hexane | 0.1 | 0.1 | 0.1 | 0.1 | 0.1 | 0.1 |
|  | Octane | 0.1 | 0.1 | 0.1 | 0.1 | 0.1 | 0.1 |

|  |  | Comparative example 1 | Comparative example 2 | Comparative example 3 | Comparative example 4 | Comparative example 5 | Comparative example 6 |
|---|---|---|---|---|---|---|---|
| Overall Wall thickness (mm) | Min. | 2.8 | 3.4 | 3.4 | 2.6 | 2.8 | 2.6 |
|  | Ave. | 3.9 | 4.2 | 4.3 | 4.2 | 4.2 | 4.0 |
|  | Max. | 7.4 | 6.6 | 6.1 | 7.8 | 7.0 | 8.0 |
| Wall thickness of intermediate layer (mm) | Min. | 0.06 | 0.07 | 0.06 | 0.05 | 0.05 | 0.06 |
|  | Ave. | 0.12 | 0.12 | 0.10 | 0.13 | 0.12 | 0.11 |
|  | Max. | 0.15 | 0.14 | 0.12 | 0.16 | 0.15 | 0.13 |
| Adhesion strength (kg/10 mm) |  | below 0.1 | below 0.1 | 18.2 | 11.2 | 10.9 | 8.5 |
| Low-temperature drop strength (drums/drums) |  | 7/10 | 8/10 | 10/10 | 6/10 | 8/10 | 7/10 |
| Solvent permeation (g/day) | Toluene | 0.2 | 0.1 | 2.4 | 0.2 | 0.2 | 0.2 |
|  | Hexane | 0.1 | 0.1 | 2.0 | 0.1 | 0.1 | 0.1 |
|  | Octane | 0.1 | 0.1 | 2.8 | 0.1 | 0.1 | 0.1 |

As evident from the above illustrations, in accordance with the invention, a multilayer container having good interlayer adhesion and excellent impact resistance and solvent permeation resistance can be obtained without using adhesive layer. Moreover, since no adhesive layer is necessary, the production is settled with two extruders and, with regard to the structure of dies, a simpler structure can be adopted as well over a method using three kinds and five layers thus permitting the reduction in the installation cost and running cost for production.

What is claimed is:

1. A large-sized container made of a laminate comprising:
   a layer (A) including a modified polyolefin modified with 0.005 to 1.0 wt. % unsaturated carboxylic acid or derivative thereof, having a melt flow rate determined under a load of 2.16 kg of 0.01 to 10 g/10 min and a melt flow rate determined under a load of 21.6 kg of 0.5 to 50 g/10 min and having a Mw/Mn > 17 and Mz/Mw > 7, and
   a layer (B) including a modified polyamide comprising (a) 50 to 95 wt. % polyamide and (b) 5 to 50% polyolefin modified with 0.005 to 1.0 wt. % unsaturated carboxylic acid or derivative thereof, having a melt flow rate determined under a load of 2.16 kg of 0.01 to 10 g/10 min, the mixture of (a) and (b) having a melt flow rate determined at a temperature of 235° C. under a load of 2.16 kg of 0.01 to 7.0 g/10 min.

2. The large-sized container described in claim 1, wherein the polyolefin before modification is at least one of high-density polyethylene, low-density polyethylene, linear low-density polyethylene, ethylene-vinyl acetate copolymer, polypropylene.

3. The large-sized container described in claim 1, wherein the unsaturated carboxylic acid for modification of the polyolefin is maleic anhydride.

4. The large-sized container described in claim 1, wherein the content of the unsaturated carboxylic acid in the modified polyolefin (A) is 0.01-0.1 wt. %.

5. The large-sized container described in claim 1, wherein the content of the unsaturated carboxylic acid in the modified polyolefin (B)-(b) is 0.05-0.5 wt. %.

6. The large-sized container described in claim 1, wherein the melt flow rate of the modified polyolefin (A) is 0.02-3.0 g/10 min.

7. The large-sized container described in claim 1, wherein the melt flow rate of the modified polyolefin (B)-(b) is 0.02-5.0 g/10 min.

8. The large-sized container described in claim 1, wherein the n-heptane solubles of the modified polyolefin (B)-(b) are not more than 3.0 wt. %.

9. The large-sized container described in claim 1, wherein the polyamide (B)-(a) is a linear high molecule having acid amide linkage —CONH—.

10. The large-sized container described in claim 9, wherein the polyamide (B)-(a) has a high proportion of amino groups at the end.

11. The large-sized container described in claim 10, wherein the concentration ratio of end amino groups to end carboxyl groups is not less than 2.0.

12. The large-sized container described in claim 10, wherein the molecular weight of polyamide with high end amino group corresponds to a relative viscosity of 3.0 to 4.8.

13. The large-sized container described in claim 1, wherein the constitution of layers is at least one of (A)/(B), (B)/(A) and (A)/(B)/(A).

* * * * *